United States Patent [19]
Yoshikawa

[11] Patent Number: 5,831,714
[45] Date of Patent: Nov. 3, 1998

[54] PHOTOGRAPHIC PROCESSING SYSTEM AND COLLATING SYSTEM

[75] Inventor: Sumio Yoshikawa, Kanagawa, Japan

[73] Assignee: Fuji Photo Film Co., Ltd., Kanagawa, Japan

[21] Appl. No.: 371,168

[22] Filed: Jan. 11, 1995

[30] Foreign Application Priority Data

Jan. 31, 1994 [JP] Japan .................................. 6-009869
Apr. 8, 1994 [JP] Japan .................................. 6-071073

[51] Int. Cl.⁶ .................................................. G03B 27/52
[52] U.S. Cl. ...................................................... 355/40
[58] Field of Search .............................. 355/27, 40, 39

[56] References Cited

U.S. PATENT DOCUMENTS

| | | | |
|---|---|---|---|
| 5,032,707 | 7/1991 | Gudmundson et al. | 355/40 X |
| 5,093,684 | 3/1992 | Crochetierre et al. | 355/40 |
| 5,093,686 | 3/1992 | Shigaki | 355/77 |
| 5,426,481 | 6/1995 | Slater et al. | 355/40 X |
| 5,473,402 | 12/1995 | Long et al. | 355/40 X |

*Primary Examiner*—Fred L. Braun
*Attorney, Agent, or Firm*—Sughrue, Mion, Zinn, Macpeak and Seas

[57] ABSTRACT

A photographic processing system. On a photographic film used for photographing images, an ID for specifying the photographic film is recorded in advance by codes which are mechanically and visually readable. On an accommodating case for accommodating the photographic film therein, the ID for specifying the photographic film is recorded in advance by the codes which are mechanically and visually readable. A reader reads at least one of the ID recorded on the photographic film, the ID recorded on the accommodating case, an ID recorded on a photographic printing paper onto which the images recorded on the photographic film are printed, an ID recorded on a DP bag used for handling photographic materials between a DPE shop and a lab, and an ID recorded on an index sheet on which the images recorded on the photographic film are recorded. Since the reader is provided, the burden imposed on the operator in the reading operation is alleviated, and photographic materials can be delivered speedily and reliably between a DPE shop and a customer.

15 Claims, 9 Drawing Sheets

SHIPMENT

PHOTOGRAPHIC PROCESSING SYSTEM AND COLLATING SYSTEM

BACKGROUND OF THE INVENTION

1. Field of the Invention

The present invention relates to a photographic processing system which uses, among photographic materials, a photographic film for photographing images, with an ID for specifying the photographic film being recorded in advance on the photographic film by mechanically and visually readable codes, and an accommodating case for accommodating the photographic film, with the ID being recorded in advance on the accommodating case by mechanically and visually readable codes. After the photographic film is temporarily removed from the accommodating case, a photographic printing paper is subjected to print processing using the photographic film, and the photographic film is returned to the accommodating case.

2. Description of the Related Art

In general, in photographic processing systems, there are a large lab (a system for processing photographic films in large volumes at a DPE speciality shop) and a mini lab (a system for processing photographic films in small volumes at a DPE shop or the like).

In either system, if the customer orders simultaneous printing or the like, a cartridge is placed in a DP bag, and the name of the customer, his or her telephone number, the name of the film manufacturer, the print size, and the like are written on part of the DP bag, thereby accepting the order.

After the photographic film is subjected to development processing (and simultaneous printing), the photographic film is cut into units of a predetermined number of image frames (normally six image frames), and the cut pieces of the photographic film are accommodated in a negative sheet, and are returned to the customer.

However, in recent years, a proposal has been made to rewind the photographic film back into the cartridge after the photographic film is temporarily removed from the cartridge and development processing and print processing on a photographic printing paper are carried out. This processing makes it possible to omit the process of cutting the photographic film and the process of accommodating the negative film into the negative sheet. Also, since the negative film is returned in the cartridge, it has been conceived to provide an index print or the like.

If such processing is performed, the DP bag, the cartridge, the photographic film, and the index print may possibly become separated and scattered. In order to tally them without fail and return them to the customer, a certain collating means would be required, but this collation has hitherto been carried out by relying on the manual operation (visual operation) of the operator.

SUMMARY OF THE INVENTION

In view of the above-described problems, an object of the present invention is to provide a photographic processing system which is capable of alleviating the burden imposed on the operator in the collating operation, and of effecting speedy and reliable delivery between the DPE shop and the customer by grasping the flow of the photographic materials, and which is particularly capable of efficiently performing the operation of collation between accommodating cases and the photographic films.

To this end, in accordance with a first aspect of the present invention, there is provided a photographic processing system comprising: a photographic film which is used for photographing images and on which an ID for specifying the photographic film is recorded in advance by codes which are mechanically and visually readable; an accommodating case for accommodating the photographic film therein and on which the ID for specifying the photographic film is recorded in advance by the codes which are mechanically and visually readable; and a reader for reading at least one of the ID recorded on the photographic film, the ID recorded on the accommodating case, an ID recorded on a photographic printing paper onto which the images recorded on the photographic film are printed, an ID recorded on a DP bag used for handling photographic materials between a DPE shop and a lab, and an ID recorded on an index sheet on which the images recorded on the photographic film are recorded.

In accordance with a second aspect of the present invention, the photographic processing system according to the first aspect of the present invention further comprises: a collating device for collating at least two of the ID recorded on the photographic film, the ID recorded on the accommodating case, the ID recorded on the photographic printing paper, the ID recorded on the DP bag, and the ID recorded on the index sheet, wherein the reader has a photographic-film-ID reading device for reading the ID recorded on the photographic film and an accommodating-case-ID reading device for reading the ID recorded on the accommodating case, and wherein the collating device collates the ID read by the photographic-film-ID reading device with the ID read by the accommodating-case-ID reading device.

In accordance with a third aspect of the present invention, the photographic processing system according to the first aspect of the present invention further comprises: a printer for printing one of the ID recorded on the photographic film and the ID recorded on the accommodating case onto at least one of the photographic printing paper, the DP bag, and the index sheet, and a collating device for collating at least two of the ID recorded on the photographic film, the ID recorded on the accommodating case, the ID recorded on the photographic printing paper, the ID recorded on the DP bag, and the ID recorded on the index sheet, wherein the reader has an accommodating-case-ID reading device for reading the ID recorded on the accommodating case, the printer has a DP-bag printer for printing the ID read by the accommodating-case-ID reading device onto the DP bag, and the reader further has a DP-bag-ID reading device for reading the ID printed by the DP-bag printer, and wherein the collating device collates the ID read by the accommodating-case-ID reading device with the ID read by the DP-bag-ID reading device.

In accordance with a fourth aspect of the present invention, the photographic processing system according to the first aspect of the present invention further comprises: a printer for printing one of the ID recorded on the photographic film and the ID recorded on the accommodating case onto at least one of the photographic printing paper, the DP bag, and the index sheet, and a collating device for collating at least two of the ID recorded on the photographic film, the ID recorded on the accommodating case, the ID recorded on the photographic printing paper, the ID recorded on the DP bag, and the ID recorded on the index sheet, wherein the printer has a DP-bag printer for printing the ID read by the reader onto the DP bag and a photographic-printing-paper printer for printing the ID read by the reader onto the photographic printing paper, and the reader has a DP-bag-ID reading device for reading the ID printed by the DP-bag printer and a photographic-printing-paper-ID reading device for reading the ID printed by the photographic-printing-paper printer, and wherein the collating device collates the ID read by the DP-bag-ID reading device with the ID read by the photographic-printing-paper-ID reading device.

In accordance with a fifth aspect of the present invention, the photographic processing system according to the first aspect of the present invention further comprises: a printer for printing one of the ID recorded on the photographic film and the ID recorded on the accommodating case onto at least one of the photographic printing paper, the DP bag, and the index sheet, and a collating device for collating at least two of the ID recorded on the photographic film, the ID recorded on the accommodating case, the ID recorded on the photographic printing paper, the ID recorded on the DP bag, and the ID recorded on the index sheet, wherein the printer has a DP-bag printer for printing the ID read by the reader onto the DP bag and a photographic-printing-paper printer for printing the ID read by the reader onto the photographic printing paper, and the reader has an accommodating-case-ID reading device for reading the ID recorded on the accommodating case, a DP-bag-ID reading device for reading the ID printed by the DP-bag printer, and a photographic-printing-paper-ID reading device for reading the ID printed by the photographic-printing-paper printer, and wherein the collating device collates the ID read by the accommodating-case-ID reading device, the ID read by the DP-bag-ID reading device, and the ID read by the photographic-printing-paper-ID reading device.

In accordance with a sixth aspect of the present invention, the photographic processing system according to the first aspect of the present invention further comprises: a printer for printing one of the ID recorded on the photographic film and the ID recorded on the accommodating case onto at least one of the photographic printing paper, the DP bag, and the index sheet, and a collating device for collating at least two of the ID recorded on the photographic film, the ID recorded on the accommodating case, the ID recorded on the photographic printing paper, the ID recorded on the DP bag, and the ID recorded on the index sheet, wherein the printer has a DP-bag printer for printing the ID read by the reader onto the DP bag, a photographic-printing-paper printer for printing the ID read by the reader onto the photographic printing paper, and an index-sheet printer for printing the ID read by the reader onto the index sheet, and the reader has an accommodating-case-ID reading device for reading the ID recorded on the accommodating case, a DP-bag-ID reading device for reading the ID printed by the DP-bag printer, a photographic-printing-paper-ID reading device for reading the ID printed by the photographic-printing-paper printer, and an index-sheet-ID reading device for reading the ID printed by the index-sheet printer, and wherein the collating device collates the ID read by the accommodating-case-ID reading device, the ID read by the DP-bag-ID reading device, the ID read by the photographic-printing-paper-ID reading device, and the ID read by the index-sheet-ID reading device.

In accordance with a seventh aspect of the present invention, there is provided a photographic processing system comprising: a photographic film which is used for photographing images and on which an ID for specifying the photographic film is recorded in advance by codes which are mechanically and visually readable; an accommodating case for accommodating the photographic film therein and on which the ID for specifying the photographic film is recorded in advance by the codes which are mechanically and visually readable; and a printer for printing one of the ID recorded on the photographic film and the ID recorded on the accommodating case onto at least one of a photographic printing paper, a DP bag used for handling photographic materials between a DPE shop and a lab, and an index sheet on which the images recorded on the photographic film are recorded.

In accordance with an eighth aspect of the present invention, in the photographic processing system according to the seventh aspect of the present invention, the printer has a DP-bag printer for printing the ID recorded on the accommodating case onto the DP bag.

In accordance with a ninth aspect of the present invention, in the photographic processing system according to the seventh aspect of the present invention, the printer has a photographic-printing-paper printer for printing one of the ID recorded on the photographic film and the ID recorded on the accommodating case onto the photographic printing paper.

In accordance with a 10th aspect of the present invention, in the photographic processing system according to the seventh aspect of the present invention, the printer has an index-sheet printer for printing one of the ID recorded on the photographic film and the ID recorded on the accommodating case onto the index sheet.

In accordance with an 11th aspect of the present invention, there is provided a photographic processing system comprising: a photographic film which is used for photographing images and on which an ID for specifying the photographic film is recorded in advance by codes which are mechanically and visually readable; an accommodating case for accommodating the photographic film therein and on which an ID identical to the ID recorded on the photographic film is recorded in advance by codes which are mechanically and visually readable; a holder having a plurality of loading portions into which the accommodating cases respectively separated from the photographic films can be loaded, an address being allotted to each of the plurality of loading portions; a storage medium in which the ID recorded on the accommodating case and the address of the loading portion into which the accommodating case is loaded are stored as a pair when the accommodating case is loaded in one of the plurality of loading portions; a retrieving device for retrieving the address of the accommodating case which is stored in the storage medium, by reading the ID of the photographic film when the photographic film is accommodated in the accommodating case; and a positioning device for positioning one of the plurality of loading portions which corresponds to the address retrieved by the retrieving device at an accommodating position where the photographic film is accommodated in the accommodating case.

In accordance with a 12th aspect of the present invention, the photographic processing system according to the 11th aspect of the present invention further comprises: an ID reading/copying device which, in a case where the address of the accommodating case corresponding to the ID of the photographic film is not retrieved by the retrieving device and the photographic film is to be accommodated in a new accommodating case, records the ID of the new accommodating case onto the photographic film, and records the ID of the photographic film onto the new accommodating case by reading the ID recorded on the new accommodating case by a mechanically readable code and the ID of the photographic film.

In accordance with the first aspect of the present invention, since the reader is provided, the burden imposed on the operator in the reading operation is alleviated, and speedy and reliable delivery can be performed between the DPE shop and the customer.

In accordance with the second aspect of the present invention, when processing such as development processing is carried out by using photographic materials (the photographic film, the accommodating case, etc.) with the ID recorded thereon, the photographic film is temporarily removed from the accommodating case, and after completion of processing the photographic film is accommodated again into the accommodating case. For this reason, it is necessary to collate the photographic film and the accommodating case which have been temporarily separated from each other. For this reason, if the ID recorded on the photographic film is read by the photographic-film-ID reading device, and the ID recorded on the accommodating case is read by the accommodating-case-ID reading device, and if the two IDs are then collated, and the reaccommodating operation is executed when they agree, it is possible to reliably accommodate the photographic film back into the original accommodating case.

In accordance with the third aspect of the present invention, the DP bag is issued by the DPE shop, and is used as a handling/check bag among the DPE shop, the lab, and the customer. For this reason, it is necessary to collate the DP bag with the accommodating case which is to be accommodated in the DP bag. Therefore, the ID recorded on the accommodating case is read, and the ID is printed onto the DP bag by means of the DP-bag printer.

Here since the ID recorded on the DP bag is read by the DP-bag-ID reading device, and the ID recorded on the accommodating case is read by the accommodating-case-ID reading device, and the two IDs are then collated, it is possible to prevent the accommodating case from being erroneously placed in a different DP bag.

In accordance with the fourth aspect of the present invention, first, the ID recorded on the accommodating case is read, and the ID is printed onto the DP bag by the DP-bag printer. Then, by means of the photographic-printing-paper printer, the ID recorded on the photographic film is printed onto the sheets of the photographic printing paper onto which the images recorded on the photographic film are printed.

The photographic printing paper is placed in the DP bag and is returned to the customer. At that time, the ID recorded on the photographic printing paper is read by the photographic-printing-paper-ID reading device, and the ID recorded on the DP bag is read by the DP-bag-ID reading device, and the two IDs are then collated. By this collation, the photographic printing paper can be reliably placed in the predetermined DP bag.

In accordance with the fifth aspect of the present invention, as in the fourth aspect of the present invention, the ID is printed on the photographic printing paper, and is collated with the ID recorded on the DP bag, and is further collated with the ID recorded on the accommodating case, thereby making it possible to alleviate the burden imposed on the operator in the collating operation when the photographic materials placed in the DP bag and are returned to the customer.

In accordance with the sixth aspect of the present invention, since an identical ID is recorded on the photographic materials that are to be placed in the DP bag, i.e., the accommodating case, the photographic printing paper, and the index sheet, it is possible to readily perform the operation of collating them.

In accordance with the seventh aspect of the present invention, since the printer is provided, it is possible to alleviate the burden imposed on the operator, and delivery can be carried out speedily and reliably between the DPE shop and the customer.

In accordance with the eighth aspect of the present invention, an ID for specifying the photographic film is recorded in advance on the photographic film at a manufacturing stage. As for the form of this recording, it is preferable to jointly use a mechanically readable code such as a bar code and a code which is readable by a human being such as a numerals.

Meanwhile, an identical ID is also recorded on the accommodating case for accommodating the photographic film in roll form by means of codes such as a bar code and a numeral.

When the customer requests simultaneous printing or the like to the DPE shop, the DPE shop places the accommodating case in a DP bag, and the name of the customer, his or her telephone number, the print surface type, and the like are written on the DP bag to accept the order. At that time, the ID recorded on the accommodating case is printed onto the DP bag. Consequently, even if the DP bag and the accommodating case are separated, it is possible to collate them later.

In accordance with the ninth aspect of the present invention, at the time of print processing, the ID recorded on the photographic film is read, and the ID thus read is printed on the photographic printing paper by the photographic-printing-paper printer. Consequently, the photographic film and the photographic printing paper can be collated by means of the ID.

In accordance with the 10th aspect of the present invention, in a case where the photographic film, for which processing such as development processing and print processing has been completed, is accommodated as it is in the accommodating case and is returned to the customer, it is difficult for the customer to see the images recorded on the photographic film. Accordingly, when the photographic film is returned after development, at least one index print on which the images are printed is attached.

By viewing this index sheet, the customer is easily capable of specifying images to be reordered.

Since the ID read from the accommodating case is printed on the index sheet by the index-sheet printer, if the other photographic materials are collated on the basis of the ID printed on the index sheet, the collation operation can be facilitated.

In accordance with the 11th aspect of the present invention, the accommodating cases separated from the photographic films are not handled as separate units, but are handled in a state in which they are loaded in loading portions of the holder. At this time, addresses are allotted in advance to the loading portions, and the accommodating cases are accommodated in order starting with the lowest number of the address. Here, the ID of the accommodating case (with the photographic film already separated therefrom) is read, and this ID as well as the address of the loading portion in which the accommodating case is loaded are stored as a pair in the storage medium.

When the accommodating cases are loaded in all the loading portions, this holder, together with the storage medium, is brought to a process for accommodating the photographic films back into the accommodating cases.

When the photographic film is accommodated in the accommodating case, the ID recorded on the photographic film is read, and an ID which agrees is retrieved from the information stored in the storage medium. This ID and the ID read from the photographic film are set as a pair to read the stored address.

The holder is rotated in such a manner that the loading portion of the address which has been read is positioned at a predetermined position, whereby the accommodating case and the photographic film whose IDs agree are made to correspond to each other.

Since the accommodating cases are loaded in order starting with the lowest number of the address as described above, if the accommodating cases are positioned at the predetermined position in order starting with the lowest number of the address, the address of the loading portion thus positioned and the address which is retrieved on the basis of the ID read from the photographic film agree with each other.

In the event that the accommodating case separated from the photographic film has been discarded due to being damaged or the like, the ID and the address of the discarded accommodating case are not recorded. Accordingly, if the ID of the photographic film which was accommodated in the discarded accommodating case was read and retrieved, it is immediately determined that the corresponding ID is not present. That is, in the conventional case where it is assumed that the accommodating cases are rotated in proper order, and confirmation is made by the agreement between the ID of the photographic film and the ID of the accommodating case, if the accommodating case is not present as described above, it was necessary to effect collation with the IDs of all the accommodating cases. In accordance with the first aspect of the present invention, however, since it is possible to speedily ascertain that the corresponding accommodating case is not present, this photographic film can be passed, and the operation proceeds to ensuing processing, thereby making it possible to improve the operating efficiency.

In accordance with the 12th aspect of the present invention, when a new accommodating case is used instead of the accommodating case discarded due to being damaged or the like, an accommodating case on which an ID of a mechanically readable code is recorded is used as this new accommodating case. Next, this mechanically readable ID is read, and a mechanically readable code is recorded on the photographic film. For example, in the case of a photographic film having a magnetic recording layer coated thereon, the ID is magnetically recorded thereon. At the same time, the ID which is recorded on the photographic film by a visually or mechanically readable character or code is copied onto the new accommodating case. Consequently, in the collation between the photographic film and the accommodating case, collation is made possible by a new ID. In a visual determination, it is possible to use the ID which has been in use (on the discarded accommodating case) as it is, so that it is possible to effect collation with other photographic materials without the sense of incompatibility.

It should be noted that the characters or the codes referred to herein are construed to include all the numerals, the alphabet, hiragana, katakana, and Chinese characters, and at least those registered in the JIS standards.

The above and other objects, features and advantages of the present invention will become more apparent from the following detailed description of the invention when read in conjunction with the accompanying drawings.

DESCRIPTION OF THE PREFERRED EMBODIMENT

FIGS. 1 to 3 show photographic materials which are applied to an embodiment of the present invention.

Figure 1A:
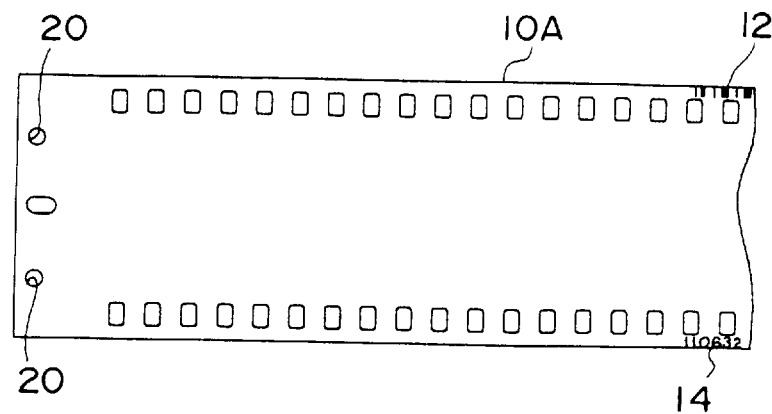
FIG. 1A is a plan view illustrating the configuration of a 35 mm film.

First, FIG. 1A shows a film 10A which is generally used, and images photographed by a camera or the like are recorded thereon. Also, an ID for identifying the film is optically recorded in advance on the film 10A. In terms of the form of its recording, both a bar code 12 which is mechanically readable and a numeral 14 which is visually readable by the operator are used. For this reason, the ID of the film 10A can be read reliably by the operator and by a mechanical means.

Figure 1B:
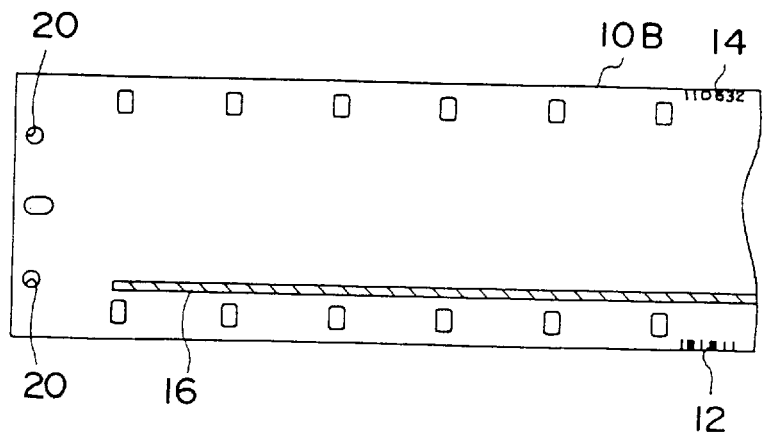
FIG. 1B is a plan view illustrating the configuration of a film with a magnetic recording layer.

FIG. 1B shows a film 10B on which a magnetic recording layer 16 is provided. On the film 10B having such a magnetic recording layer 16, in addition to the bar code 12 and the numeral 14 which are recorded thereon, it is possible to record the ID in advance on the magnetic recording layer 16 as magnetic information at a film-manufacturing stage. Or, it is possible to read the bar code at a development processing stage and record the ID together with other relevant information on the magnetic recording layer 16 as magnetic information. Hereafter, the films 10A and 10B are collectively referred to as the film 10.

Figure 1C:
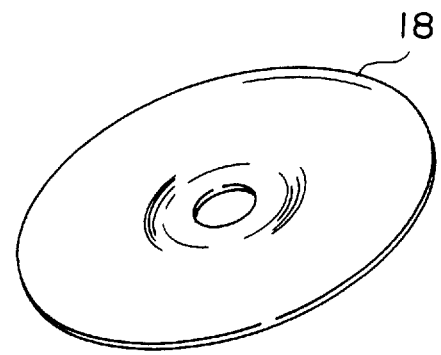
FIG. 1C is a perspective view illustrating the configuration of a photo CD.

FIG. 1C shows a photo CD 18. The photo CD is a medium in which images are recorded on a disk-shaped compact disk (CD), and it is capable of displaying images as signals are read by a laser beam and are scanned on a display or the like.

Holes 20 are formed at a trailing end of the film 10 shown in FIGS. 1A and 1B. These holes 20 are used when the film 10 is connected to a cartridge 22 (see FIG. 2A).

Figure 2A:
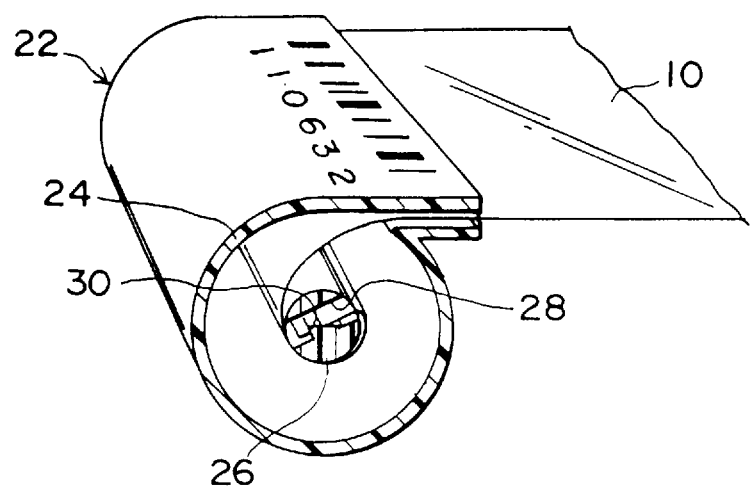
FIG. 2A is a cross section, in a perspective view, of a cartridge accommodating the film.

Next, FIG. 2A shows the cartridge 22, and a spool 26 for taking up and accommodating the film 10 in roll form is disposed inside a casing 24. A slit-like through hole 28 is formed in the spool 26 along an axial direction thereof, and projecting pawls 30 are formed on an inner peripheral surface thereof. As the projecting pawls 30 are made to fit in the holes 20 provided in the film 10, the trailing end of the film 10 is connected to the spool 26 and is taken up in roll form.

It should be noted that one end of the spool 26 projects outside the casing 24, and as the spool end is rotated, the film 10 can be inserted into or drawn out from the cartridge 22.

Figure 2B:
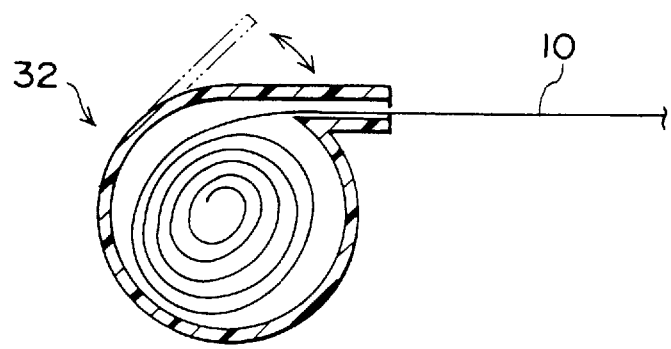
FIG. 2B is a side cross-sectional view of a lab-use cartridge used mainly in a mini lab.

FIG. 2B shows a lab-use cartridge 32 which is used for film-development processing at mini labs, in particular. This cartridge 32 is arranged such that the film is wound around the spool 26 in roll form, without being connected to the spool 26, by making use of friction between the film and the spool 26. Before development, the film 10 is taken up and accommodated in roll form in such a manner as to replace the film which was accommodated earlier in the cartridge 22. At the time of development, the film 10 is consecutively pulled out from the cartridge 22 beginning with a leading end of the film 10.

Figure 2C:
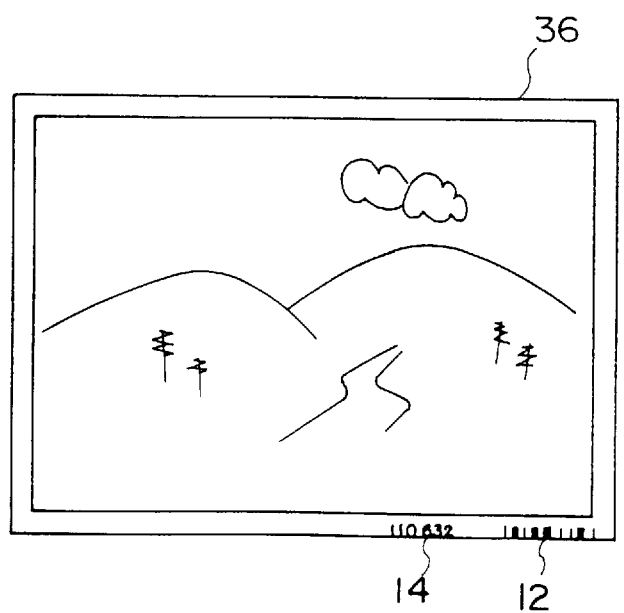
FIG. 2C is a plan view of a photographic printing paper.

FIG. 2C shows a photographic printing paper 36 onto which an image is printed. An ID is recorded at a lower right-hand end portion of the printing paper 36 in the form of the bar code 12 and the numeral 14. The ID is printed on the printing paper 36 by reading the ID recorded on the film 10 or the ID recorded on the cartridge 22. The printing position is limited to the lower right-hand end, and may be located at any place which does not affect the image.

Figure 3A:
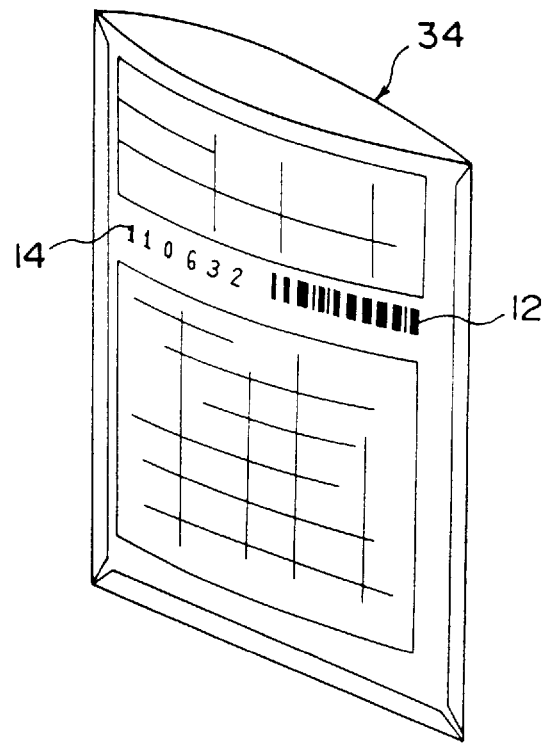
FIG. 3A is a perspective view of a DP bag.

Next, FIG. 3A shows a DP bag 34 which is issued by a DPE shop when a customer requested simultaneous printing or the like to the DPE shop. After necessary information, including the name of the customer, his or her telephone number, the name of the film manufacturer, the print size, and the like, is written on the DP bag 34, the cartridge 22 (see FIG. 2A) is placed in the DP bag 34, and is delivered to a lab.

Figure 3B:
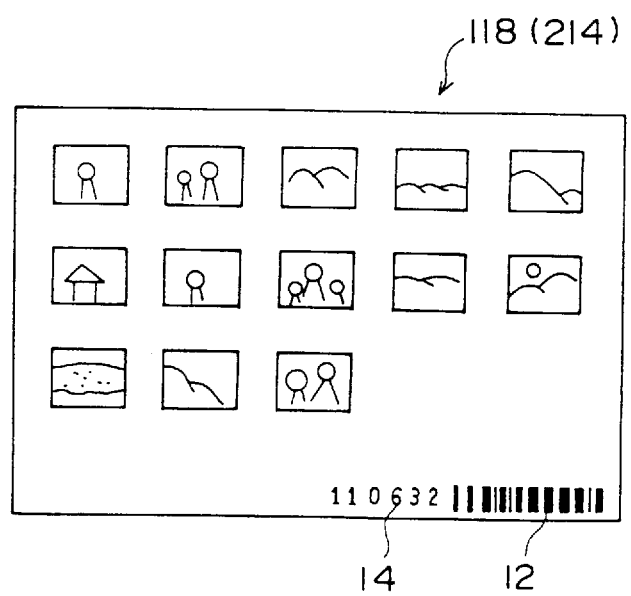
FIG. 3B is a plan view of an index print.

FIG. 3B shows an index print 118 (214) on which images recorded on one film 10 are recorded by being arranged in rows. This recording is made by, for instance, reading the images on the film 10 by using a scanner 114 (see FIG. 4) and then by effecting thermal recording, printing the images on a photographic printing paper, or toner-recording them onto plain paper.

The images recorded on the index print 118 (214) are not required to have a high image quality, and their resolution is considered to be sufficient if scenes of the images are roughly discernable. In addition, frame numbers which are allotted to the frames of the film 10 are recorded on the respective images, and the same ID as the one recorded on the film 10 is recorded thereon. As the size of the index print 118 (214), a size sufficient for the index print to be placed in the DP bag 34 is preferable.

Described above are the photographic materials which are applicable to the embodiment of the present invention. Photographic processing is effect by the lab system by using such photographic materials.

Figure 4:
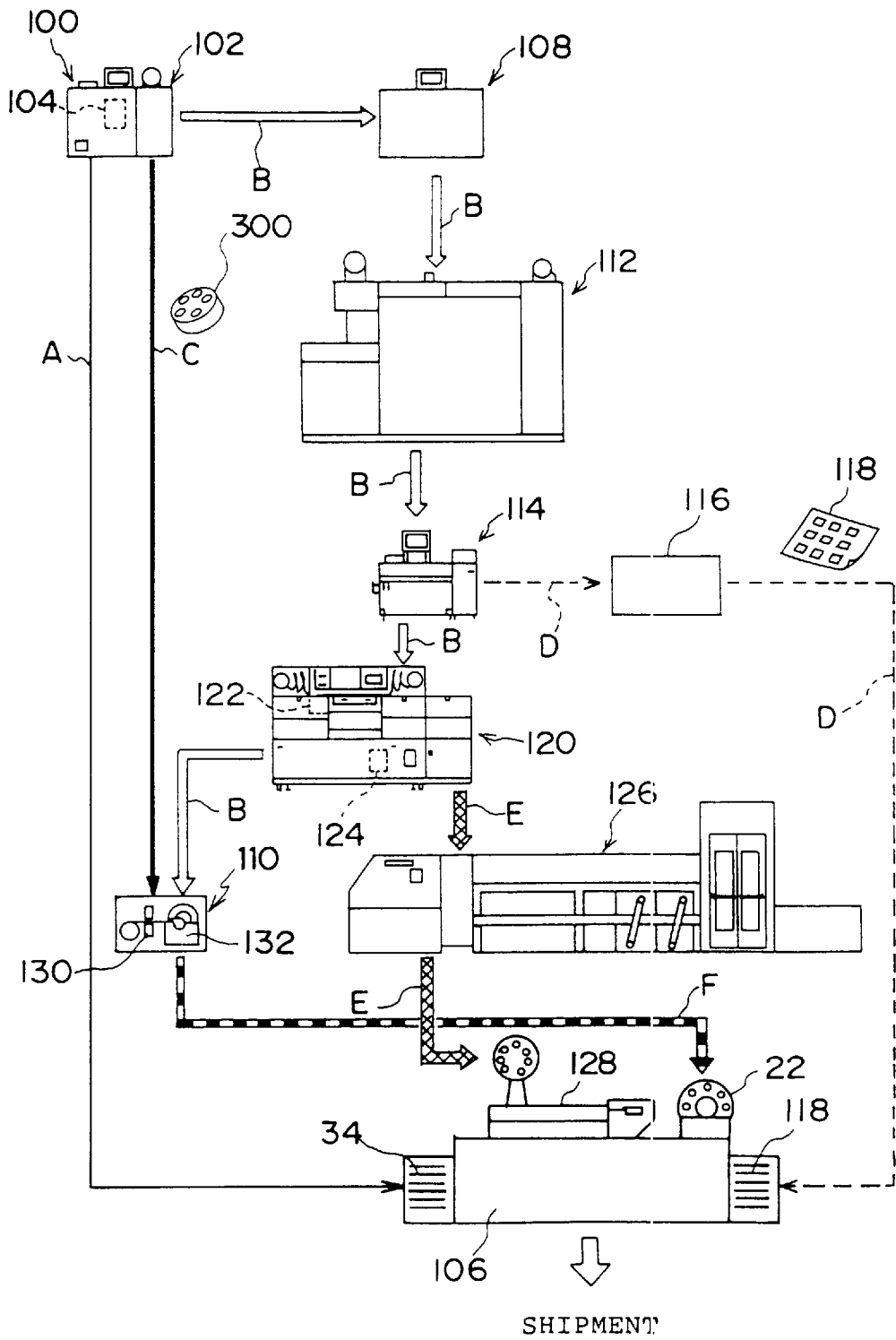
FIG. 4 is a system diagram of processing by a large lab.

FIG. 4 shows a schematic diagram of a so-called large lab as a photographic processor pertaining to the embodiment.

Figure 5:
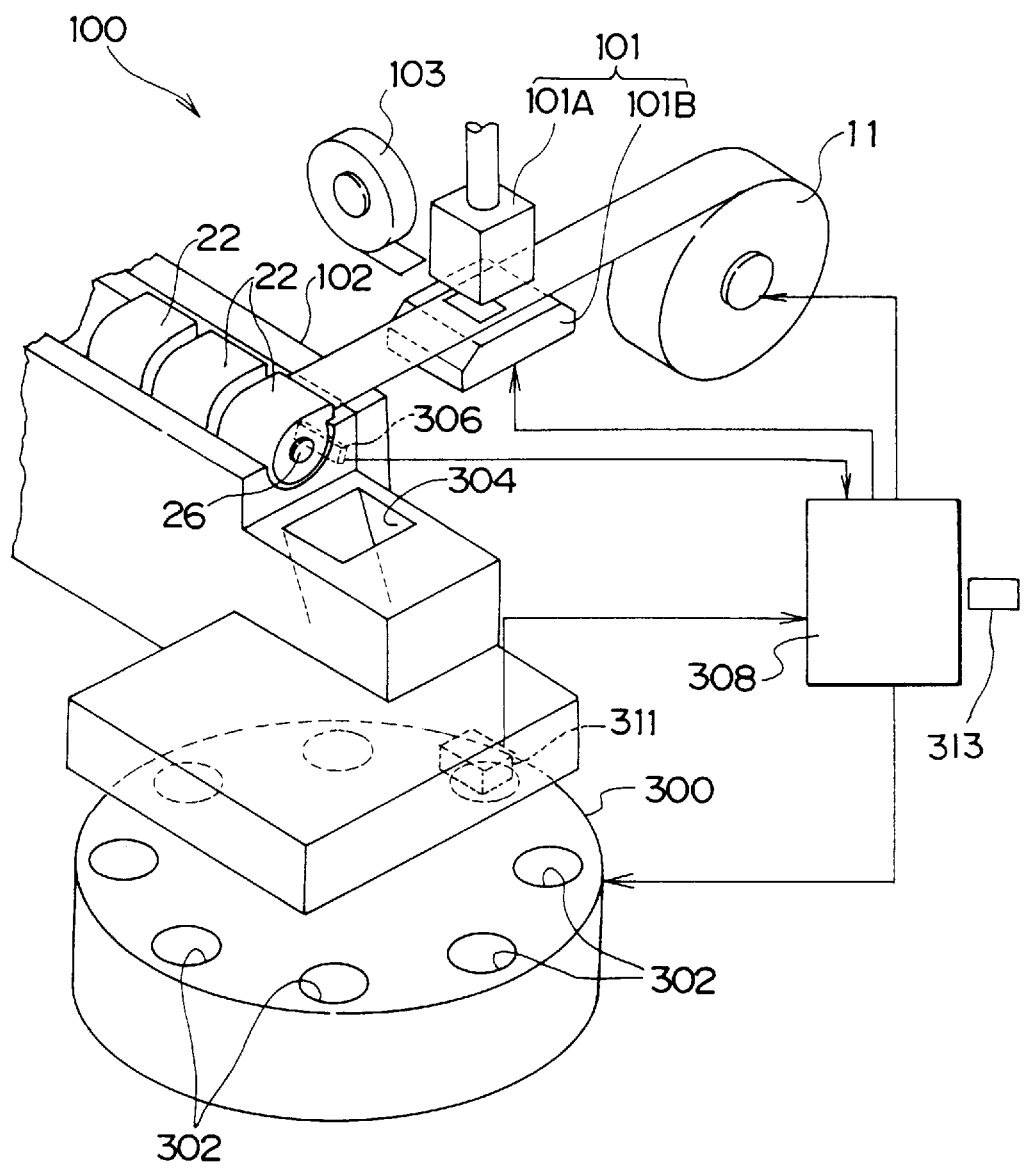
FIG. 5 is a perspective view illustrating an essential portion of a splicer in the large lab.

In the large lab, the films 10 which are accommodated in the delivered cartridges 22 are consecutively joined by a film splicer 100, thereby forming a film roll 11 of a long length. That is, as shown in FIG. 5, a splicing section 101 of the splicer 100 has a splicing head 101A and a receiving base 101B. A splicing tape 103 is fed to the splicing section 101, and splicing portions of the films 10 are nipped with the splicing tape 103 placed thereon, and are heated to splice the films 10.

After the cartridge 22 is loaded on the splicer 100, a discrimination is made between negative and positive and between black-and-white and color so as to avoid trouble in development. If it is determined that the film is suitable for development in the process that follows, the film is removed from the cartridge 22 by rotating the spool 26. In addition, a discrimination between developed film and undeveloped film is made by detecting the amount of light transmitted through, for instance, an infrared transmission sensor. If the film 10 is undeveloped, it is further drawn out from the cartridge 22.

The film splicer 100 is provided with a detacher 102. When all the film 10 has been drawn out from the cartridge 22, the detacher 102 causes a trailing end of the film 10 connected to the spool 26 to be disengaged from the spool 26. That is, the detacher 102 causes the hole 20 portions of the film 10 to be disengaged from the projecting pawls 30, separating the film 10 from the spool 26. Thus, all the film 10 is pulled out from the cartridge 22, and is spliced to another film 10.

In a case where the magnetic recording layer 16 is provided on the film 10, the ID recorded on the cartridge 22 is read, and is magnetically recorded on the magnetic recording layer 16. Incidentally, since the same ID as the one on the cartridge 22 is recorded in advance on the film 10, the magnetically recorded ID is used as a backup.

Meanwhile, the cartridges 22 are loaded in a drum-shaped cylinder 300 shown in FIG. 5. As shown in FIG. 5, a plurality of cylindrical accommodating chambers 302, in which the cartridges 22 can be accommodated with a predetermined clearance, are formed at equal intervals along the periphery of the cylinder 300. The central portion of the cylinder 300 is axially supported by a shaft (not shown) provided in the splicer 100. In the state in which the cylinder 300 is axially supported by the shaft, the cylinder 300 is capable of rotating about its axis by receiving a driving force from the shaft, so that the accommodating chambers are consecutively positioned at an outlet of a discharge port 304 for discharging the cartridge 22 separated from the film 10.

Consequently, the cartridge 22 that is discharged from the discharge port 304 is accommodated in the accommodating chamber 302. After the cartridge 22 is accommodated, the cylinder 300 is rotated by a predetermined angle (the number of accommodating grooves/360°), so that an empty accommodating chamber 302 can be positioned at the outlet of the discharge port 304. As this procedure is repeated consecutively, it is possible to load the cartridges 22 in all of the plurality of the accommodating chambers 302. Incidentally, in a case where a defective cartridge 22 has been detected (either automatically or visually), the discharged cartridge 22 is discarded through an unillustrated bypass.

A plurality of cylinders 300 are used in this photographic processing system, and an identification number is allotted to each cylinder 300. Addresses are allotted to the respective accommodating chambers 302, and by means of a sensor 311 a controller 308 reads the identification numbers of the loaded cylinders 300 and the addresses of the accommodating chambers 302 that are positioned at the outlet of the discharge port 304, and they are stored as sets. The stored data are stored in a portable storage medium 313, such as a memory card, and the storage medium 313 with the data stored is loaded on a controller 312 of an attacher 110 shown in FIG. 6.

The cylinder 300 with all the cartridges 22 stored in the accommodating chambers 302 is removed from the shaft of the splicer 100, is transported to the attacher 110 which will be described later, and is loaded rotatably on a shaft (shot shown) provided in the attacher 110.

When the cartridge 22 is transported to the film splicer 100, the DP bag 34 issued by a DPE shop accompanies the cartridge 22. After processing such as development, printing, or the like is completed, this DP bag 34 is used when the cartridge 22 and the photographic printing paper 36 (which will be described later) are placed in it and are returned to the customer. A bill is also attached to the DP bag 34. Therefore, in this embodiment, a printer 104 (see FIG. 4) is provided for reading the ID recorded on the cartridge 22 and printing the ID onto the DP bag 34. This ID is used for collation with the cartridge 22 and the like at the time of a final shipment. After the cartridge 22 is removed from the DP bag 34, the DP bag 34 is sent to a collation section 106 prior to the shipment, as shown by arrow A in FIG. 4. At this time, the DP bags corresponding to the film roll 11 are transported collectively as a lot.

As for the film roll 11 of the films 10 separated by the detacher 102 as well as the cartridges 22, the film roll 11 is transported to a checker 108 (see arrow B in FIG. 4), while the cartridges 22 are transported to the attacher 110 in the state in which the cartridges 22 are accommodated in the cylinder 300 (see arrow C in FIG. 4).

After the spliced state of the films of the film roll 11 is checked by the checker 108, the film roll 11 is transported to a film processor 112. In the film processor 112, the spliced films are transported through processing tanks for development, fixing, washing, and the like, and is subjected to dry processing, allowing latent images on the films to be made visible. The films with the images thus made visible are transported to the scanner 114 in the form of the film roll 11.

In the scanner 114, the images recorded on the film 10 are read by an imaging device such as a CCD, and the image information is supplied to an index printer 116 (see chain-line arrow D in FIG. 4). In the index printer 116, the images of one film portion are recorded on one sheet in a matrix form. This sheet is called the index print 118, and is delivered to the customer together with the cartridge 22 and the printing paper 36, i.e., prints. The index print 118 on which the images are recorded is sent to the collation section 106 as shown by the chain-line arrow D). Preferably, the index prints 118 are transported collectively in correspondence with the lot of the film roll 11.

The index printer 116 is also adapted to output the ID recorded on the film 10, and the ID is printed on a portion of the index print 118. Although an example in which the ID is printed on the obverse surface of the index print 118 is illustrated in FIG. 3A, the ID may, of course, be printed on the reverse surface thereof. The ID recorded on the index print 118 is used for collation with other photographic materials when they are returned to the customer.

Meanwhile, the film roll 11 which has been read by the scanner 114 is then transported to a printer 120. In the printer 120, the image frames of each film 10 of the film roll 11 are consecutively positioned at a printing position. At the printing position, a transmitted image is printed onto the printing paper 36 (see FIG. 2C) with a predetermined exposure. As this procedure is effected consecutively, images are consecutively printed onto the printing paper 36.

The printer 120 is provided with an ID reader 122 for reading the ID from the film 10 and an ID printer 124 for printing the read ID onto the obverse or reverse surface of the photographic printing paper 36 in correspondence with each image. At the same time as an image is printed for each image frame, the ID is also printed on the photographic printing paper 36.

The film for which print processing has been completed is transported to an attacher 110 so as to be returned to the customer. Meanwhile, the printing paper 36 is transported to a paper processor 126 (see arrow E in FIG. 4) where it is subjected to development processing.

In the paper processor 126, the printing paper 36 for which print processing has been completed is subjected to various other processing, including development, fixing, washing, drying, and the like. Subsequently, the printing paper 36 in roll form is transported to a paper cutter 128.

Figure 6:
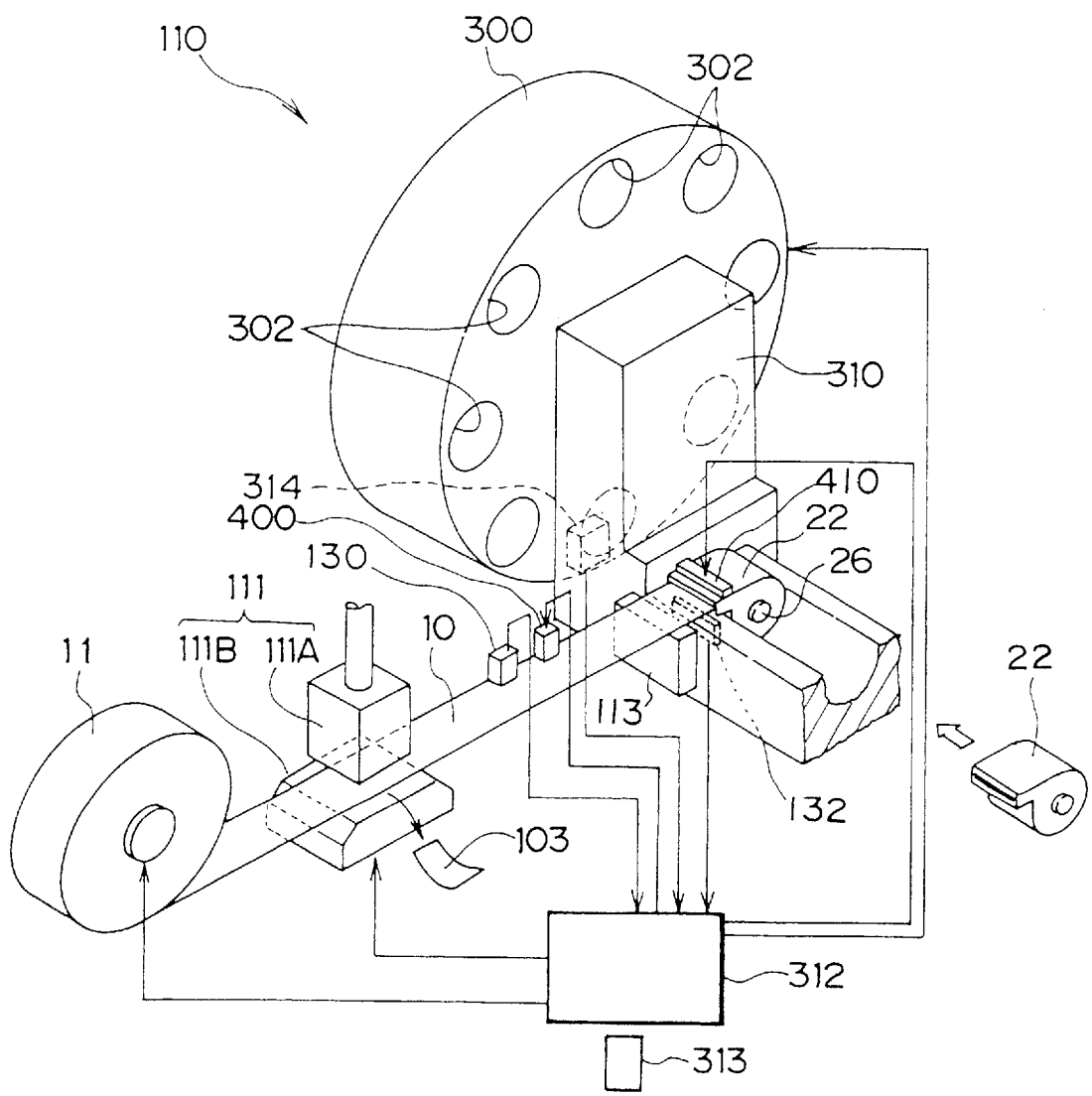
FIG. 6 is a perspective view illustrating an essential portion of an attacher in the large lab.

Meanwhile, as shown in FIG. 6, the film roll 11, for which development processing, print processing, and the like have been completed, is set on the attacher 110, and the cylinder 300 is also set thereon.

If the empty cartridges are accommodated in a stocker style in the order of splicing by the splicer, the spliced order can be easily maintained. In addition, if such a stocker is made to correspond to the lot of the film roll 11, collation is facilitated, and the stocker is convenient when it is moved.

The attacher 110 is provided with a desplicer 111 which is comprised of a heating head 111A and a receiving base 111B. As the portions of the films 10 where the splicing tape 103 is attached are nipped and heated to lower the viscosity of the tape, the splicing tape 103 is released, thereby separating the spliced portions of the films 10.

In addition, the desplicer 111 includes an attacher mechanism 113, and the leading end of the film 10 in the traveling direction thereof is guided into and engaged with the cartridge 22 by means of the attacher mechanism 113, so as to take up the film 10.

A cartridge pickup section 310 is provided adjacent to the set position of the cylinder 300. As the cylinder 300 is rotated by each predetermined angle, the accommodating chambers 302 are consecutively positioned at the pickup section 310. The pickup section 310 is adapted to pick up the cartridge 22 accommodated in each accommodating chamber 302 and transfer the cartridge 22 to a position where the film 10 is attached to the cartridge 22.

An ID reader 130 capable of optically or magnetically reading the IDs of the films 10 is disposed over a transport passage where the film travels as the leading end of the film roll 11 which has been set is drawn out. On the basis of the ID, the controller 312 reads the identification number of the cylinder 300 and the address of the accommodating chamber 302 from the storage medium 313. The identification number of the cylinder loaded on the attacher 110 is first detected by a sensor 314, and the controller 312 determines whether the identification number which has been read agrees with the detected identification number. If they agree, the controller 312 controls the rotation of the cylinder 300 in such a manner as to allow the accommodating chamber 302 corresponding to the address which has been read to be positioned at the pickup section 310. Meanwhile, an ID number reader 132 is provided at the set position of the cartridge 22 so as to read the ID of the cartridge 22. Thus, in normal cases, after the cylinder 300 is set in an original position, if the accommodating chambers 302 are sequentially positioned at the pickup section 310, the IDs of the films 10 and the IDs of the cartridges 22 agree with each other.

If the defective cartridge 22 had been discarded, since the accommodating chamber 302 corresponding to the ID which is read from the Film 10 is not read, the film 10 is removed from the normal route, and is transported to an abnormal stock section (not shown). Then, processing is effected for loading an ensuing film 10 into its cartridge 22. Namely, even if all the cartridges 22 are not read and collated, it is possible to immediately ascertain that a corresponding cartridge 22 is not present in the accommodating chamber 302 of the cylinder 300. Thus, the interruption of the operation of loading the films 10 in the respective cartridges 22 can be prevented.

It should be noted that the film 10 may be loaded into a new cartridge 22 without the film 10 being removed from the usual route and by setting a new cartridge 22 at the set position from outside. In this case, an accommodating-case-ID recorder 400 for recording the ID of a new cartridge 22 onto the film 10 is provided over the transport passage of the film 10 and on the downstream side of the ID reader 130. Also, a film-ID recorder 410 for recording the ID of the film 10 onto the new cartridge 22 is provided in the vicinity of the ID number reader 132.

When the accommodating chamber 302 corresponding to the address which has been read by the controller 312 is positioned at the pickup section 310, the cartridge 22 is removed from the cylinder 300, is positioned in place and is set on standby. After the spliced portion of the film 10 is separated, the film 10 of the long length is accommodated again as it is into the cartridge 22. Consequently, the operation of cutting the film 10 can be omitted, and in the case of the film 10 which is provided with the magnetic recording layer 16, the film 10 can be stored without cutting the magnetic recording layer 16. In addition, since the film 10 is accommodated in the cartridge 22, the film 10 is prevented from becoming damaged, and the finishing accuracy at the time of reordering is not impaired.

The cartridge 22 for which the accommodation of the film 10 has been completed is transported to the collation section 106 as shown by chain-line arrow F in FIG. 4.

In the paper cutter 128, the ID printed on each photographic printing paper 36 cut for each image is read.

The DP bags 34 and the index prints 118 are also transported to the collation section 106.

In the collation section 106, the IDs which are recorded on the DP bags 34, the cartridges 22, the sheets of the printing paper 36, and the index prints 118 are read and collated. If they agree, the cartridge 22, the prints 36, and the index print 118 are placed in the DP bag 34 and are shipped.

Hereafter, a description will be given of the operation of this embodiment.

First, when the customer brings in the cartridge 22 accommodating a photographed film 10 to the DPE shop, and requests simultaneous printing, for instance, the DP bag 34 is issued at the DPE shop, and the name of the customer, his or her telephone number, the name of the film manufacturer, the film type, and the like are written on an order slip. The cartridge 22 is then placed in the DP bag 34, and the order is thus accepted.

The DP bag 34 for which acceptance has been completed is delivered to a lab, and is first transported to the film splicer 100.

The film splicer 100 first reads the ID recorded on the cartridge 22, and prints this ID onto the DP bag 34. The DP bag 34 for which printing has been completed is transported to the collation section 106.

At that time, an empty cylinder 300 having the accommodating chambers 302 is loaded rotatably on the shaft, and is set on standby by being set in the original position (in the state in which the accommodating chamber 302 whose address is the lowest is positioned at the outlet of the discharge port 304).

Then, the film 10 is drawn out from the cartridge 22, and is taken up in the form of the film roll 11. Here, in a case where the film 10 is provided with the magnetic recording layer 16, the ID which has been read from the cartridge 22 is magnetically recorded on the magnetic recording layer 16. This magnetically recorded ID can be used as a backup in the event that the ID recorded in advance on the film 10 has become unreadable due to some cause. In addition, in a case where the film 10 is accommodated in a new accommodating cartridge or the like due to the defective photographing cartridge, even if the original ID of the photographic film and the ID of the new accommodating cartridge or the like differ, error does not occur in collation if priority is placed on this magnetically recorded ID.

When all the film 10 is drawn out, the hole 20 portions of the film 10 are disengaged from the projecting pawls 30 of the spool 26, so that the film 10 is temporarily separated from the cartridge 22. The separated cartridge 22 is accommodated in the accommodating chamber 302 in the cylinder 300 through the discharge port 304. At this time, the ID of the cartridge 22, the identification number of the cylinder 300, and the address of the accommodating chamber 302 are set in the controller 308, and are stored in the storage medium 313.

As the above-described procedure is repeated, and in the state in which the cartridges 22 are accommodated in all the accommodating chambers 302, the cylinder 300 is removed from the shaft, and is transported to the attacher 110 together with the storage medium 313. In addition, a new cylinder 300 is loaded on the film splicer 100.

When the film 10 is drawn out, in the event that some abnormality is detected from the cartridge 22, if the film 10 is rewound into this cartridge 22, there is the risk of damaging the film or making it impossible to draw out the film again. Such a defective cartridge 22 is not accommodated in the accommodating chamber 302, and is discarded through a bypass. Accordingly, the identification number of the cylinder and the address of the accommodating chamber which correspond to the ID of this discarded cartridge 22 do not exist.

The trailing ends and the leading ends of the films 10 are spliced consecutively, and are formed into the film roll 11 of a predetermined number of films 10. The film roll 11 in this state is transported to the film processor 112.

In the film processor 112, the roll films 10 of the film roll 11 are guided by a leader and are subjected to various processing steps such as development, fixing, washing, and drying, and images are made visible.

The films 10 in the roll form, for which development processing and the like have been completed by the film processor 112, are transported to the scanner 114 where the images in the image frames are read by an imaging device such as a CCD. The image data which have been read are transmitted to the index printer 116. On the basis of the image data, the index printer 116 records images of one film 10 on a sheet in a matrix form in which the images are arranged in rows each containing a number of frames, thereby preparing the index print 118. By virtue of this index print 118, even if the film 10 is returned to the customer in a state in which the film 10 is accommodated in the cartridge 22, the customer is easily able to see the images recorded on the film 10.

Also, the scanner 114 reads the ID recorded on each film 10, and transmits the ID to the index printer 116 which prints the ID thus read onto the index print 118. As a result, the index print 118 can be easily collated with other photographic materials by means of the printed ID. Incidentally, the index print 118 is transported to the collation section 106 after preparation thereof is completed.

The films 10 whose images have been read by the scanner 14 are then transported to the printer 120. In the printer 120, the frames of the images recorded on each film 10 are consecutively positioned at a printing opening, and the printing paper 36 is imagewise exposed by light transmitted through the film 10 via an optical system, thereby printing images.

Here, an ID is recorded at a leading end of each spliced film 10, and the printer 120 reads this ID, which is printed on the obverse or reverse surface of the printing paper 36 in correspondence with the images printed on the printing paper 36. Accordingly, an identical ID is printed onto the printing paper 36 for each film. Incidentally, the frame number, information on recording by the camera, and the like may be printed onto the printing paper 36 together with the printing of the ID.

The films 10 used in the printer 120 are transported to the attacher 110. In the attacher 110, the spliced films are separated from each other, and the respective films 10 are consecutively accommodated in their original cartridges 22. Namely, as for the film 10 whose spliced condition is canceled, the ID recorded on the film 10 is read. Meanwhile, the cylinder 300 transported from the film splicer 100 is loaded in the attacher 110, and remains on standby at the original position. Also, the storage medium 313 is also loaded in the attacher 110. Here, on the basis of the ID which has been read from the film 10, the controller 312 reads the identification number of the cylinder 300 and the accommodating groove 302, and collates the identification number of the cylinder 300 thus read with the identification number of the cylinder 300 which is presently loaded. If they agree with each other in the collation, the address of the accommodating chamber 302 thus read is collated with the address of the accommodating chamber 302 positioned at the pickup section 310. If they also agree, it can be determined that the cartridge 22 accommodated in the accommodating chamber 302 is the original cartridge 22, so that the cartridge 22 is fetched and is set in a predetermined position. At this set position, the ID recorded on the cartridge 22 is read. Here, a determination is made as to whether both the IDs of the film 10 and the cartridge 22 agree with each other, and if it is determined that they agree (since they naturally agree, the ID of the cartridge 22 may not be read), the trailing end of the film 10 is inserted into the cartridge 22 by using a guide member, and the hole 20 portions are engaged again with the projecting pawls 30 provided in the through hole 28 in the spool 26. As the spool 26 is rotated after completion of the engagement, the film 10 is taken up consecutively until all the film 10 is accommodated in the cartridge 22.

Next, the cylinder 300 is rotated by a predetermined angle, and if the above-described procedure is repeated in a state in which an ensuing accommodating chamber 302 is positioned at the pickup section 310, it is possible to consecutively accommodate the films 10 into their original cartridges 22.

Here, the defective cartridge 22 is discarded without being accommodated in the accommodating chamber 302 of the cylinder 300, but in the conventional case where an arrangement is simply provided such that the ID of the film 10 is read and is collated with the ID of the cartridge 22, it was necessary to collate the IDs of all the cartridges 22 until they agree (actually, there are no IDs which agree). In this embodiment, however, the ID of the film 10 is read, and the cylinder 300 and the accommodating chamber 302 in the cylinder 300 are specified from this ID to effect collation, it can be immediately ascertained that the corresponding cartridge 22 does not exist. Accordingly, the film 10 whose cartridge 22 does not exist can be fed into the abnormal stock section via a separate passage, and the operation can quickly proceed to the operation of loading an ensuing film 10 into the cartridge 22, thereby improving the operating efficiency.

The cartridges 22 into which the films 10 are accommodated are transported from the attacher 110 to the collation section 106.

Meanwhile, the printing paper 36 with images printed thereon by the printer 120 is transported to the paper processor 126 where it is subjected to various processing such as development, fixing, washing, and drying, and the images are thereby made visible. The printing paper 36 is then transported to the paper cutter 128.

Here, the DP bags 34, the index prints 118, the cartridges 22, and the printing paper 36 are collected in the collation section 106, and the IDs recorded on them are read. Here, if the IDs agree, the cartridge 22, the index print 118, and the printing paper (prints) 36 are placed in the DP bag 34 with a bill attached thereon, and are shipped. The DP bags 34 thus shipped are delivered to the respective DPE shops which made the requests, and are returned to the customers.

Thus, since the IDs are recorded on all the photographic materials, and processing proceeds while collation is carried out in respective sections, even if the photographic materials are transported and processed separately, it is possible to allow them to reliably tally in a final stage without relying upon complicated manual operations of confirming the images.

Although, in this embodiment, the storage medium 313 is prepared separately from the cylinder 300, and the storage medium 313 is used to store information and is transported from the splicer 100 to the attacher 110, an arrangement may be provided such that only the cylinder 300 may be transported by providing a part of the cylinder 300 with the storage function.

Figure 7:
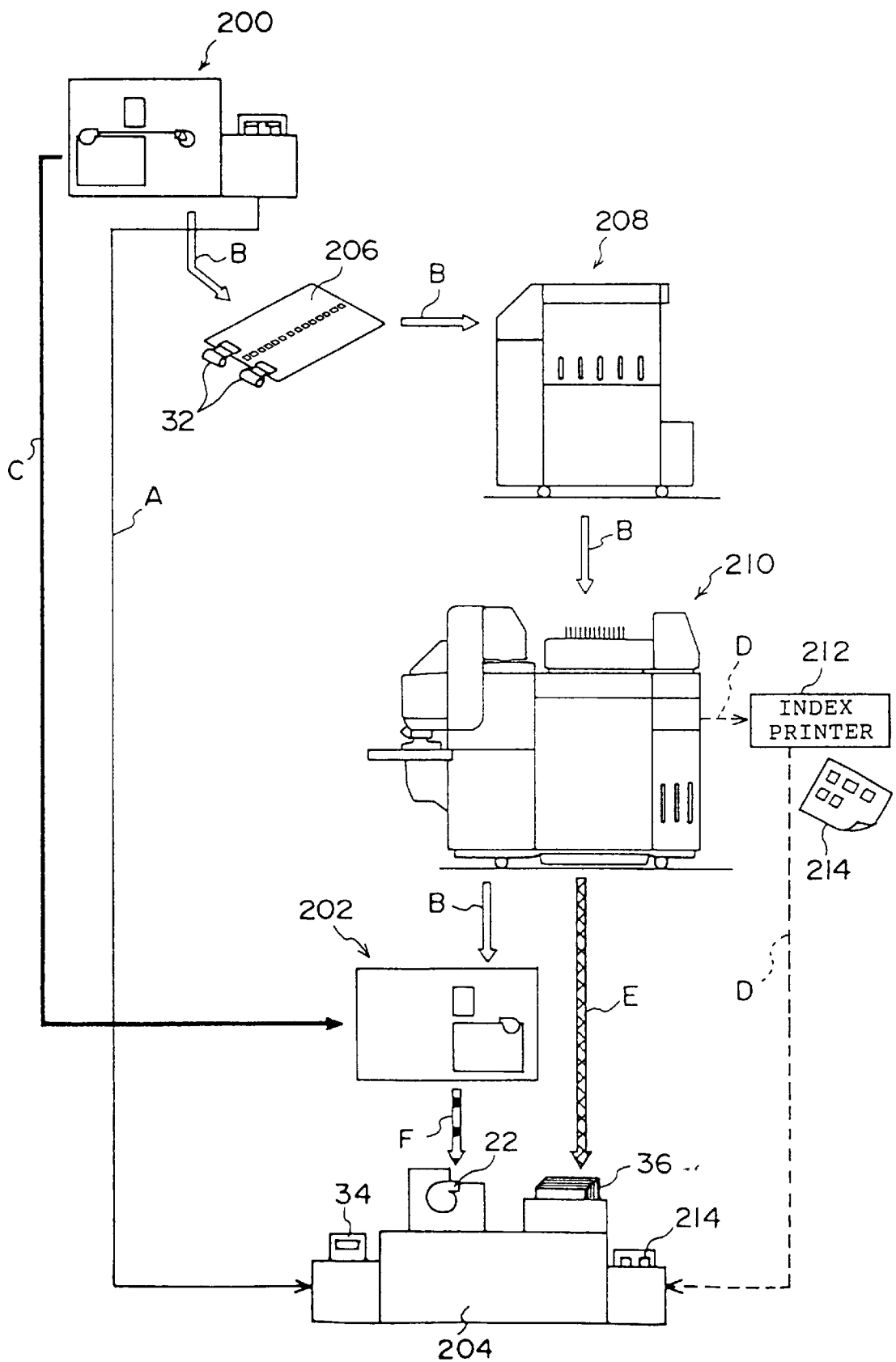
FIG. 7 is a system diagram of processing by a mini lab.

Although, in this embodiment, a description has been given of the photographic processing system in a large lab, it is also possible to alleviate the complicated operations in mini labs for processing small volumes at DPE shops, in a similar manner by recording IDs on photographic materials and collating them. Hereafter, a description will be given of an outline of a photographic processing system for a mini lab shown in FIG. 7.

When photographed cartridges 22 are brought in to the DPE shop and simultaneous printing or the like is requested, the details of the orders of the requests are manually written on the DP bags 34, and the cartridges 22 are placed in the DP bags.

After completion of the acceptances, the DP bags 34 are temporarily sorted out in the order of acceptance.

The DP bags 34 and the cartridges 22 are set in a handy detacher 200.

Figure 8:
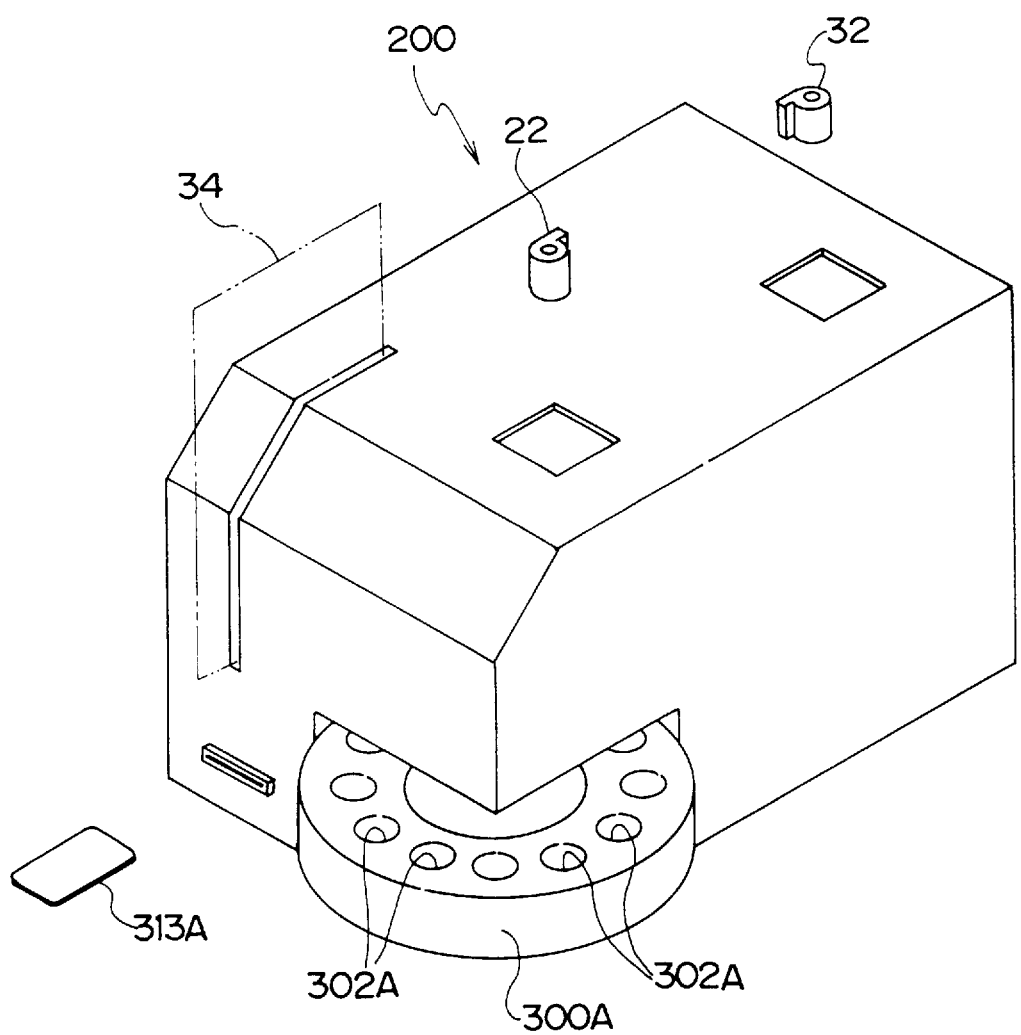
FIG. 8 is a perspective view illustrating an essential portion of a handy detacher in the mini lab.

As shown in FIG. 8, in the handy detacher 200, the films 10 are drawn out from the cartridges 22, and are rewound around lab-use cartridges 32, respectively. As for the empty cartridges 22, their IDs are read, and the empty cartidges 22 are accommodated in accommodating chambers 302A of a cylinder 300A in the order of acceptance. The ID, the identification number of the cylinder 300A, and the address of the accommodating chamber 302A accommodating the cartridge are stored as a set. The stored data are stored in a storage medium 313A. When all the accommodating chambers 302A of the cylinder 300A are filled, the cylinder 300A, together with the storage medium 313A, is sent to a handy attacher 202 which will be described later.

Here, when there is a need to read the ID mechanically from the DP bag 34 in a later process, the ID is read from the cartridge 22, and is recorded on the DP bag 34 in the form of a code such as a bar code. Alternatively, in a case where the operator confirms the ID visually without resorting to a mechanical means, easy-to-read characters may be printed, or both a bar code and characters may be written. The DP bags 34 with the IDs (bar codes or the like) printed thereon are sent to a collation section 204.

As for the lab-use cartridges 32, two pieces are set as one set, are spliced to a leader 206, and are loaded in a film processor 208. This leader 206 serves to guide the films 10 inside the film processor 208, and the films 10 are thereby drawn out from the lab-use cartridges 32, and are reliably subjected to various processing such as development, fixing, washing, and drying.

The empty lab-use cartridges 32 are returned to the handy detacher 200.

The films 10 for which processing such as development has been completed are separated from the leader 206, and are set in a printer processor 210 one by one.

In the printer processor 210, the frames of the images recorded on the film 10 are consecutively positioned at a printing position so as to print images onto the printing paper 36.

Here, in the printer processor 210, the ID recorded on the film 10 is read, and the ID thus read is printed on the obverse or reverse surface of the printing paper 36 for each print processing. For this reason, when the images recorded on the identical film 10 are printed, an identical ID is printed on the printing paper 36.

In reordering prints and make-over prints, since the developed film of a long length is wound as it is in the cartridge 22, it is necessary to set the cartridge on a film carrier to effect printing. In this case, the ID recorded on the cartridge 22 may be read, and the ID may be printed on the printing paper 36.

In the printer processor 210, the images recorded on the film 10 are read by an imaging device such as a CCD, and the image data are outputted to an index printer 212. The index printer 212 prepares an index print 214 on the basis of the data transmitted thereto. Incidentally, the ID of the film 10, together with the image data, is outputted from the printer processor 210, and this ID is printed on the prepared index print 214.

The sheets of the printing paper 36 for which print processing has been completed in the printer processor 210 are transported to the collation section 204, while the films 10 are transported to the handy attacher 202.

Figure 9:
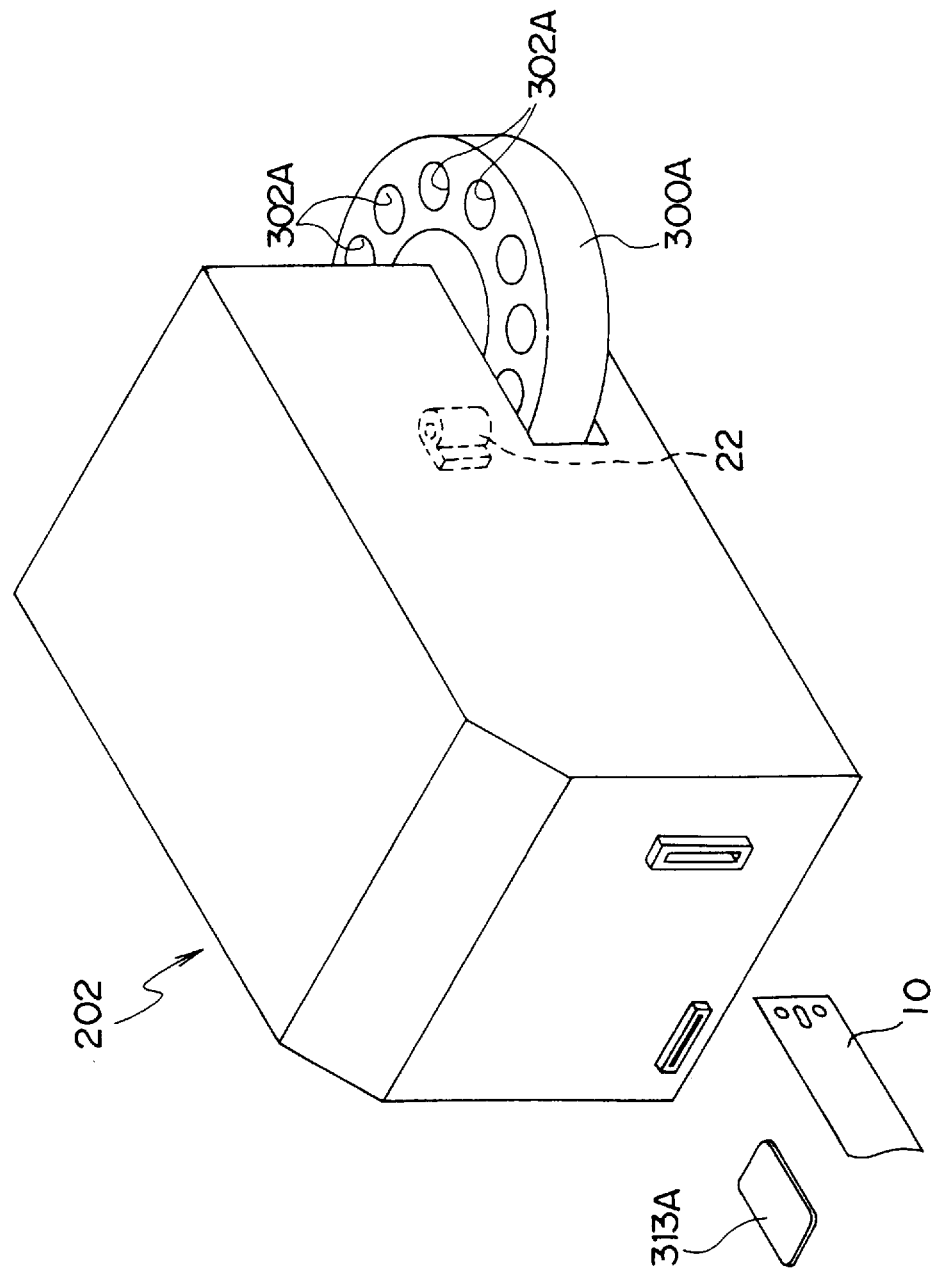
FIG. 9 is a perspective view illustrating an essential portion of a handy attacher in the mini lab.

As shown in FIG. 9, in the handy attacher 202, the cylinder 300A accommodating the cartridges 22, from which the films 10 were drawn out by the handy detacher 200, is set in advance on standby in its original position. In the hand attacher 202, the ID is read from the film 10, the identification number of the cylinder 300A and the address of the accommodating chamber 302A are read from the storage medium 313A on the basis of this ID, and the identification number of the cylinder 300A thus read is collated with the identification number of the loaded cylinder 300A. If they agree, the address of the accommodating chamber 302A which has been read is collated with the address of the accommodating chamber 302A located at the pickup section. If they agree in the collation, it is determined that the accommodated cartridge 22 tallies with the ID of the film 10, so that the film 10 is rewound into the cartridge 22, and is sent to the collation section 204.

In the collation section, the IDs which are recorded on the DP bag 34, the cartridge 22, the prints 36, and the index print 214 are read and are collated. If they tally, the cartridge 22, the prints 36, and the index print 214 are placed in the DP bag 34, and are shipped.

Thus, in the mini lab as well, by collating the IDs which are provided on the film 10, the prints 36, the DP bag 34, and the index print 214, it is possible to alleviate the burden imposed on the operator in the collating operation while confirming the images, and to effect the collating operation accurately and speedily.

It should be noted that, in both large labs and mini labs, in the collation of IDs the IDs may not be mechanically read, but be visually confirmed by the operator.

It should be noted that, at the time of collation in the collation section 204, after the film 10 is drawn out from the cartridge 22, correspondence between the film image and the image on the printing paper may be visually confirmed by a viewer which is capable of confirming the images recorded on the film 10.

Further, an arrangement may be provided such that information for the index print is fetched to the collation section 204, and an image corresponding to the ID of the cartridge being processed is displayed on a CRT monitor as a positive image. If correspondence between the displayed image and the image on the printing paper is visually confirmed, it is unnecessary to print the ID on the printing paper 34 or the index print. Incidentally, as for the displayed image, the entire frames may be displayed, or a certain frame (a leading frame, a final frame, or the like) may be displayed. At the same time, data on the number of prints may also be displayed, and correspondence with a count value of the number of sheets obtained by cutting by the paper cutter 128 may also be confirmed, and this information may be used at the time of preparation of a bill.

In the above-described process at the mini lab, if the amount of processing is such that all the accommodating chambers 302A of the cylinder 300A are not loaded with the cartridges 22 (in the case of processing in small volumes), it suffices if the operator reads the IDs of the cartridges 22 one by one by using a handy-type ID reader, and accommodate the cartridges 22 sequentially in the accommodating chambers 302A. If the cartridges 22 are thus accommodated in the accommodating chambers 302A through the operator's manual operation, inserting errors are liable to occur. In this embodiment, even if there are inserting errors, the presence or absence of a corresponding cartridge ID and its accommodating chamber can be readily ascertained from the ID which is read from the film 10 for each cylinder 300A.

In addition, if the cartridge 22 has been discarded as the defective cartridge 22, it is necessary to accommodate the film corresponding to the same in a new cartridge 22. In this case, a cartridge 22, in which a numeral or the like which can be visually confirmed by the operator has not been entered in its ID column, and a bar code or the like which is mechanically readable is recorded in advance, is used as the new cartridge 22.

The ID recorded on the film 10 is written in a numeral in the blank column, and the film 10 and the cartridge 22 are thereby made to correspond to each other. As a result, the ID of the defective cartridge 22 is recorded on the new cartridge 22 by the numeral, so that correspondence can be obtained with the other photographic materials.

Meanwhile, although the ID recorded by the bar code differs from the ID of this numeral, the ID recorded by the bar code is, for instance, magnetically recorded on the film 10. Consequently, during automatic collation, collation can be obtained by this ID which is mechanically read. Also, since the human being understands only the numeral, continued use can be made of the ID which has been in use.

Hereafter, a description will be given of various forms of processing concerning photographic processing at large labs and mini labs.

(1) Selection of Image Printer

In media capable of recording information in addition to image information, such as magnetically recordable films and photo CDs, a device for printing out is designated in the course of photographing or processing in the lab, and printing is effected in accordance with the instruction during printing. In this case, the designation of printing is recorded as magnetic information in the case of a film with a magnetically recording layer, and is recorded in a floppy disk in the case of a photo CD.

By effecting the above-described selection, it becomes possible to print for each case or each frame by using a different printer. When digital printing is carried out, the image quality differs substantially depending on the system or type of the printer. For instance, in the case of color laser printers (CLPs), it is possible to obtain fine prints like ordinary photographs, but also there are output devices which do not excel in color reproducibility. In terms of prices as well, systems range widely from those whose prints are inexpensive to those whose prints are expensive. Hence, it becomes possible for the user to photograph images by taking this aspect into consideration during photographing.

That is, as the user (photographer) selects whether to order prints with a high image quality or to order inexpensive prints, and records the selection on the film, the lab is able to make the determination even if such an order is not made explicitly to the DPE shop or the like on each such occasion. In addition, in the case of the film with the magnetically recording layer, since recording can be made on the negative, it is unnecessary to use another recording medium, so that it is rational.

(2) Discrimination of Film with Magnetically Recording Layer

Printing conditions differ in a case where the film 10B with the magnetically recording layer and the film 10A without the magnetic recording layer are processed in a mixed form. For example, the printing conditions differ in the printing magnification, the amount of paper feed, exposure amount, and so on.

Accordingly, if the film type can be automatically discriminated before printing, it is possible to change the aforementioned printing conditions, thereby making it possible to effect efficient printing.

Since magnetically recorded information is recorded in advance on the film 10B with the magnetic recording layer, if the magnetically recorded information is read prior to printing, and if the information is meaningful one, it can be determined that the film is the film 10B with the magnetic recording layer. Meanwhile, in the case of the film without the magnetic recording layer, there is no magnetically recorded information, so that the information cannot be read.

Since it does not necessarily follow that information is recorded on the film with the magnetic recording layer, the apparatus may be provided with a writing head and a reading head, and by executing an operation of writing some information unfailingly prior to printing, the determination may be made on the basis of whether or not the information was written.

(3) Detection of Film Damage

If a continuous meaningful signal is recorded in advance in the film 10B with the magnetic recording layer as magnetically recorded information, in the event that a cut, a perforation slit, or the like is present in the film 10B, the magnetically recorded information is discontinuous, so that it is possible to detect damage of the film 10B.

At the time of splicing prior to the development of the films at large labs, a perforation slit is conventionally detected by a noctovision camera or by finger touch since the film has not yet been developed. However, by detecting the presence or absence of the continuity of the magnetically recorded information, it is possible to detect the damage of the film 10 efficiently and reliably. Incidentally, by combining the magnetically recorded information with the information on the film length (the number of exposures), it is possible to detect a midway cut in the film 10B more effectively.

(4) Management of Number of Negative Lots

The management of the number of frames in one lot of films subjected in a lab is conducted by the perforations provided in the films 10.

Normally, a fixed number of films 10 are spliced and are handled as one lot. The size of the lot is determined by the printer, the processor, and the time required for finishing, and so on. Conventionally, the lot management has been carried out by this number, but the lot management can be conducted more accurately by the number of printing frames.

For this reason, in the case of the film 10B with the magnetic recording layer, since a predetermined number (one or two) of perforations are provided for one frame, the number of frames becomes the count of the perforations . the predetermined number. The perforations can be readily detected if a light-projecting unit and a light-receiving unit are optically disposed above and below the obverse and reverse surfaces of the film 10, respectively.

(5) Positioning of Images

The position of a printed image is basically specified by means of perforations. Depending on cameras, however, there are cases where images are photographed by being slightly offset from predetermined positions based on the perforations. In this case, the printed images will undergo splitting of the image plane. Accordingly, if a more accurate frame position can be detected by detecting the position of the photographed image, the amount of offset of the frame position is magnetically recorded as an amount of correction from the positioning based on the perforations, and correction is carried out by reading this information by a printer or the like. Thus, it is possible to position the images accurately.

(6) Correction of Gradations During Printing

Since the images recorded on the film 10 are conventionally exposed on the printing paper 36 via lenses, it has been impossible to change the gradation. For example, there are cases where if an attempt is made to change an underexposed facial portion to the flesh color, the overall tone becomes reddish brown.

Accordingly, if the exposure amount in the camera is increased or decreased during photographing, the information is magnetically or optically recorded on the film 10, and the gradation is correction by reading this information at the time of printing, thereby making it possible to improve the finish of the print.

That is, an inappropriate exposure during photographing is magnetically recorded by the n value of the number of stops $2^n$ with respect to an appropriate exposure, and the amount of deviation from the appropriate exposure is ascertained by reading this information by a printer, so as to correct the gradation.

As a result, even if an inappropriate exposure occurred during photographing, it is possible to obtain an appropriate finish during printing, and it is possible to prevent a reddish brown finish occurring in the case of an underexposure. In addition, since this is equivalent to the fact that the film sensitivity is virtually improved, it is in some cases unnecessary to use an electronic flash, and it is possible to prevent blurring which can otherwise occur due to an increased shutter speed. Furthermore, it is possible to reduce the diameter of the lens.

(7) Allotment of Acceptance Numbers

It has already been described that if ID numbers are provided to the photographic materials, and the ID numbers are collated, it is possible to save manpower. Furthermore, if serial numbers are recorded on the cartridges 22 in the order of acceptance, and these serial numbers in the order of acceptance are recorded on the other photographic materials in the same way as the IDs, even if an operator is present in the course of processing, the serial numbers are easy to read, and errors can be prevented. Hence, the operation can be simplified.

(8) Shop-Counter Acceptance Machine

If the film 10 as accommodated in the cartridge 22 is returned to the customer, the form of the film within the cartridge 22 becomes unclear. In other words, distinctions between undeveloped film and developed film, between negative and positive, between color and black-and-white, and so on become unclear. Therefore, it is conceivable to record the form on the film 10 accommodated in the cartridge 22 by characters or a code, or to provide an index on the cartridge 22 by using a notch or an indicator. However, an erroneous recording or index may possibly be given, and the error concerning the distinction between undeveloped film and developed film, in particular, can lead to a serious problem in that the photographed images can be erroneously exposed.

Accordingly, an acceptance machine which is capable of setting the cartridge 22 in a state of a darkroom is desirably provided at a counter of the DPE shop. In this acceptance machine, when the cartridge 22 is set, the cartridge 22 is set in the state of a darkroom, and the spool 26 is rotated to draw out the leading end of the film 10.

The transmittance of the film 10 at this drawn-out portion, the physical properties of the emulsion, and the thickness, or a mark and the like are checked to distinguish between developed film and undeveloped film, between negative and positive, between color and black-and-white, and so on.

In addition, the acceptance machine may be provided with a monitor function and a viewer function, and in the case of the cartridge 22 accommodating the developed film 10, it is possible for the shop clerk to confirm the details of the order, engaging in a dialogue with the customer while viewing images.

In the case where the film 10 is provided with the magnetically recording layer 16, if the above-described information is magnetically recorded and is sent to a lab, no mistake is made as to the details of the order.

Furthermore, if the acceptance machine is adapted to issue an order slip in which the details of the order, the name of the customer, where to make contact, the date of acceptance, the name of the shop, estimated delivery date, a charge, and the like are written, it is possible to leave evidence with respect to the customers and the lab.

(9) Cartridge Indicator

An optical disk, for instance, is provided for the cartridge 22, and information on the distinctions between negative and positive, between color and black-and-white, and undeveloped film and developed film as well as the film length are recorded (indexed), whereby processes in the lab are classified, the timing for replenishing processing solutions such as a developer is managed, transporting time is measured to detect jamming and the like at an early period, thereby mitigating damage to the film 10.

(10) Reordering of Prints

At the time of reordering of prints, ordered frames are specified by using a keyboard which is arranged in the same way as an order format of a reordering blank or the arrangement of frames of the index prints 118 and 214 on which a plurality of frames are printed.

As a result, the specification of orders during acceptance at the shop and the lab is facilitated, and mistakes can be prevented, so that it is possible to improve the operating efficiency. In addition, it is also an effective ordering method to directly indicate the images displaced on a screen by using a touch key or a pen light.

Incidentally, during reprinting, since the film 10 is accommodated in the cartridge 22, if the ID recorded on the cartridge 22 or the film 10 is collated with the ID recorded on the index print 118 or 214, and if a warning or the like is issued when they do not tally, it is possible o prevent an error in the designation of the cartridge 22.

As described above, in the photographic system in accordance with the present invention, outstanding advantages are offered in that the burden imposed on the operator in the collation operation is alleviated, speedy and reliable delivery can be effected between the DPE shop and the customer by grasping the flow of the respective photographic materials, and, in particular, the operation of collation between accommodating cases and the photographic films can be performed efficiently.

What is claimed is:

1. A photographic processing system comprising:
    a photographic film which is used for photographing images and on which an ID for specifying the photographic film is recorded in advance by codes which are mechanically and visually readable;
    an accommodating case for accommodating the photographic film therein and on which the ID for specifying the photographic film is recorded in advance by the codes which are mechanically and visually readable;
    a reader for reading at least one of the ID recorded on the photographic film, the ID recorded on the accommodating case, an ID recorded on a photographic printing paper onto which the images recorded on the photographic film are printed, an ID recorded on a DP bag used for handling photographic materials between a DPE shop and a lab, and an ID recorded on an index sheet on which the images recorded on the photographic film are recorded, wherein
    said reader comprises a DP-bag-ID reading device for reading the ID recorded on the DP bag.

2. A photographic processing system according to claim 1, further comprising:
    a printer for printing one of the ID recorded on the photographic film and the ID recorded on the accommodating case onto at least one of the photographic printing paper, the DP bag, and the index sheet.

3. A photographic processing system according to claim 2, further comprising:
    a collating device for collating at least two of the ID recorded on the photographic film, the ID recorded on the accommodating case, the ID recorded on the photographic printing paper, the ID recorded on the DP bag, and the ID recorded on the index sheet.

4. A photographic processing system according to claim 3, wherein the reader further comprises an accommodating-case-ID reading device for reading the ID recorded on the accommodating case, the printer has a DP-bag printer for printing the ID read by the accommodating-case-ID reading device onto the DP bag, and the DP-bag-ID reading device reads the ID printed by the DP-bag printer, and wherein the collating device collates the ID read by the accommodating-case-ID reading device with the ID read by the DP-bag-ID reading device.

5. A photographic processing system according to claim 3, wherein the printer has a DP-bag printer for printing the ID read by the reader onto the DP bag and a photographic-printing-paper printer for printing the ID read by the reader onto the photographic printing paper, and the DP-bag-reading device reads the ID printed by the DP-bag printer, the reader further comprising a photographic-printing-paper-ID reading device for reading the ID printed by the photographic-printing-paper printer, and wherein the collating device collates the ID read by the DP-bag-ID reading device with the ID read by the photographic-printing-paper-ID reading device.

6. A photographic processing system according to claim 3, wherein the printer has a DP-bag printer for printing the ID read by the reader onto the DP bag and a photographic-printing-paper printer for printing the ID read by the reader onto the photographic printing paper, and the reader further comprises an accommodating-case-ID reading device for reading the ID recorded on the accommodating case, and a photographic-printing-paper-ID reading device for reading the ID printed by the photographic-printing-paper printer, and wherein the collating device collates the ID read by the accommodating-case-ID reading device, the ID read by the DP-bag-ID reading device, and the ID read by the photographic-printing-paper-ID reading device.

7. A photographic processing system according to claim 3, wherein the printer has a DP-bag printer for printing the ID read by the reader onto the DP bag, a photographic-printing-paper printer for printing the ID read by the reader onto the photographic printing paper, and an index-sheet printer for printing the ID read by the reader onto the index sheet, and the reader further comprises an accommodating-case-ID reading device for reading the ID recorded on the accommodating case, a photographic-printing-paper-ID reading device for reading the ID printed by the photographic-printing-paper printer, and an index-sheet-ID reading device for reading the ID printed by the index-sheet printer, and wherein the collating device collates the ID read by the accommodating-case-ID reading device, the ID read by the DP-bag-ID reading device, the ID read by the photographic-printing-paper-ID reading device, and the ID read by the index-sheet-ID reading device.

8. A photographic processing system according to claim 1, further comprising:
 a collating device for collating at least two of the ID recorded on the photographic film, the ID recorded on the accommodating case, the ID recorded on the photographic printing paper, the ID recorded on the DP bag, and the ID recorded on the index sheet.

9. A photographic processing system according to claim 8, wherein the reader further comprises a photographic-film-ID reading device for reading the ID recorded on the photographic film and an accommodating-case-ID reading device for reading the ID recorded on the accommodating case, and wherein the collating device collates the ID read by the photographic-film-ID reading device with the ID read by the accommodating-case-ID reading device.

10. A photographic processing system comprising:

a photographic film which is used for photographing images and on which an ID for specifying the photographic film is recorded in advance by codes which are mechanically and visually readable;

an accommodating case for accommodating the photographic film therein and on which an ID identical to the ID recorded on the photographic film is recorded in advance by codes which are mechanically and visually readable;

a holder having a plurality of loading portions into which the accommodating cases respectively separated from the photographic films can be loaded, an address being allotted to each of the plurality of loading portions;

a storage medium in which the ID recorded on the accommodating case and the address of the loading portion into which the accommodating case is loaded are stored as a pair when the accommodating case is loaded in one of the plurality of loading portions;

a retrieving device for retrieving the address of the accommodating case which is stored in the storage medium, by reading the ID of the photographic film when the photographic film is accommodated in the accommodating case; and a positioning device for positioning one of the plurality of loading portions which corresponds to the address retrieved by the retrieving device at an accommodating position where the photographic film is accommodated in the accommodating case.

11. A photographic processing system according to claim 10, further comprising:
 an ID reading/copying device which, in a case where the address of the accommodating case corresponding to the ID of the photographic film is not retrieved by the retrieving device and the photographic film is to be accommodated in a new accommodating case, records the ID of the new accommodating case onto the photographic film, and records the ID of the photographic film onto the new accommodating case by reading the ID recorded on the new accommodating case by a mechanically readable code and the ID of the photographic film.

12. A photographic processing system according to claim 10, further comprising:
 a reader for reading the ID recorded on the accommodating case and the address of the loading portion into which the accommodating case is loaded.

13. A photographic processing system according to claim 10, wherein the positioning device has a pickup device for fetching the accommodating case loaded in the holder.

14. A photographic processing system according to claim 10, wherein the retrieving device has a holder-identification-number reading device for reading an identification number recorded on the holder, and wherein the retrieving device collates the identification number recorded on the holder with the identification number of the holder stored in the storage medium.

15. A photographic processing system according to claim 10, further comprising:
 a desplicer for desplicing spliced portions of a plurality of the photographic films and for attaching the photographic film whose spliced portion has been despliced to the accommodating case, so as to take up the photographic film onto the accommodating case.

* * * * *